July 29, 1947.  F. L. ALBEN  2,424,543
DRIVE DEVICE
Filed Feb. 9, 1945  2 Sheets-Sheet 2
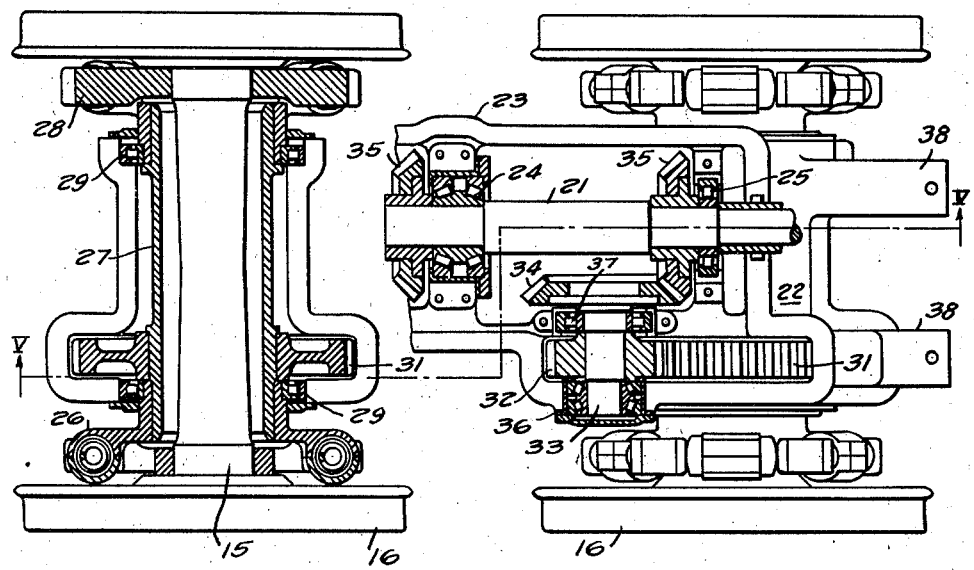
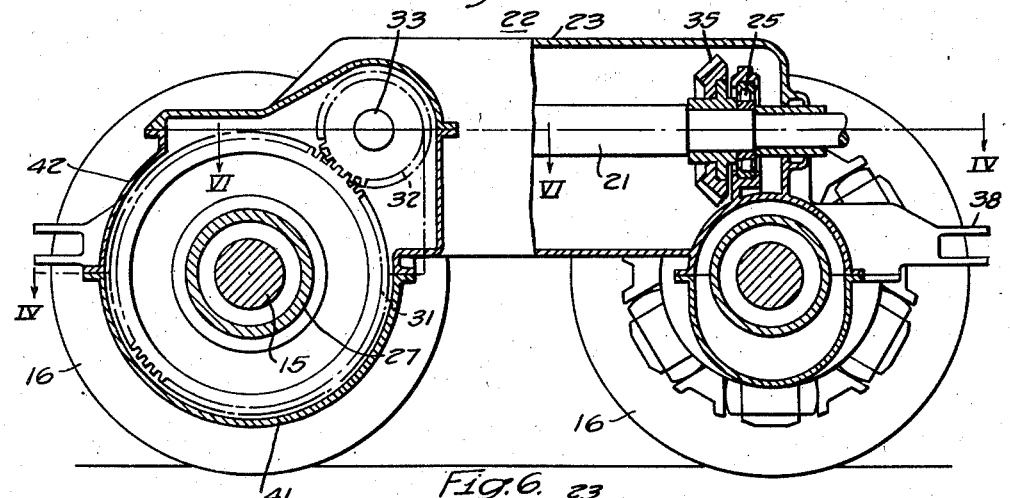
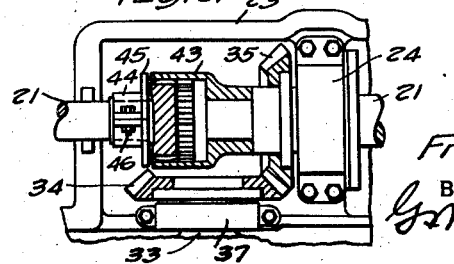
WITNESSES:
INVENTOR
Frank L. Alben.
BY
ATTORNEY Patented July 29, 1947

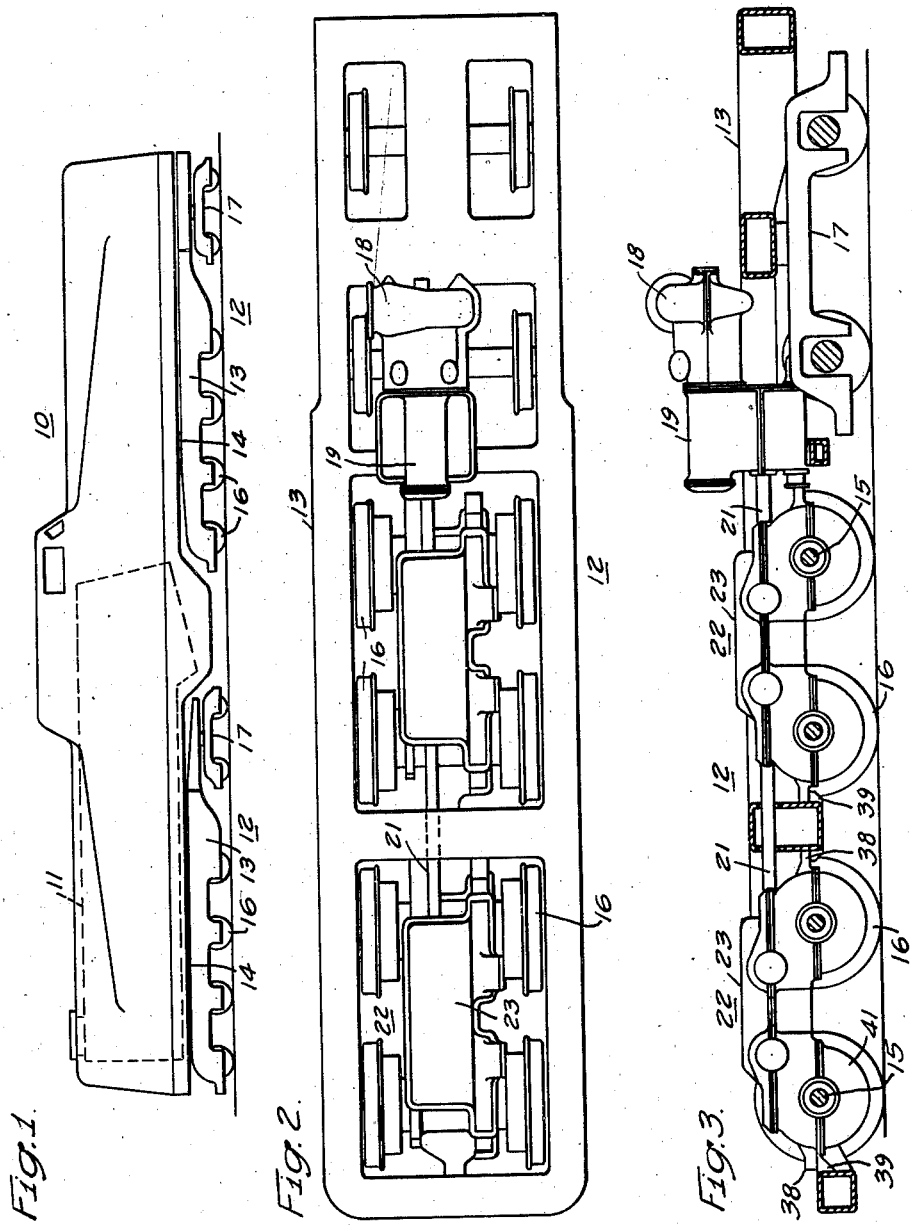

2,424,543

UNITED STATES PATENT OFFICE 2,424,543

DRIVE DEVICE

Frank L. Alben, Pittsburgh, Pa., assignor to Westinghouse Electric Corporation, East Pittsburgh, Pa., a corporation of Pennsylvania Application February 9, 1945, Serial No. 577,083

5 Claims. (Cl. 105—98)

My invention relates, generally, to locomotive drives and more particularly, to drives for transmitting torque from one source of power, such as a steam or gas turbine, to a plurality of driving axles.

In view of the demand for motive power having higher speeds and greater hauling capacity with economy of fuel and water, steam turbines are being utilized as the prime movers for locomotives. However, in order for turbine driven locomotives to deliver maximum power and operate most efficiently, they must be provided with a relatively large number of driving wheels and means for driving a plurality of the wheels from a single turbine.

An object of my invention, generally stated, is to provide a drive for a turbine locomotive which shall be simple and efficient in operation, and which may be economically manufactured and installed.

A more specific object of my invention is to provide a flexible drive for transmitting torque from a single turbine to a plurality of the axles of a locomotive.

Another object of my invention is to provide a gear drive unit which may be readily removed from the main truck frame of a locomotive.

Other objects of my invention will be explained fully hereinafter or will be apparent to those skilled in the art.

In accordance with one embodiment of my invention, each driving axle of a locomotive is driven by a double end flexible spring cup quill drive. A spur gear is secured to each quill and is driven by a pinion secured to a shaft on which is mounted a bevel gear which meshes with a second bevel gear mounted on a drive shaft disposed longitudinally of the locomotive. The gears for each pair of adjacent axles are all contained in a gear case supported by the main truck frame. The low speed gear with the quill drive can be removed easily from the main truck, and each pair of adjacent driving axles with their component parts can also be removed without disturbing the remainder of the drive unit.

For a fuller understanding of the nature and objects of my invention, reference may be had to the following detailed description, taken in conjunction with the accompanying drawings, in which:

Figure 1 is a view, in side elevation, of a locomotive embodying my invention;

Fig. 2 is an enlarged view, in plan, of one of the driving trucks of the locomotive;

Fig. 3 is a view partially in side elevation, and partially in section, of the truck shown in Fig. 2;

Fig. 4 is an enlarged view, partially in plan and partially in section, of one of the reduction gear and flexible drive units for the locomotive, the section being taken along the line IV—IV of Fig. 5;

Fig. 5 is a sectional view, taken along the line V—V of Fig. 4, and

Fig. 6 is a sectional view, taken along the line VI—VI of Fig. 5.

Referring to the drawings, and particularly to Fig. 1, the locomotive shown therein comprises a cab portion 10 having a boiler 11 disposed therein and space for storing the fuel and water required for operating the locomotive. The cab 10 is carried by two main truck frames 12 which may be identical in construction.

As shown most clearly in Figs. 2 and 3, each truck frame 12 comprises a one-piece steel frame 13 with side members and journal boxes disposed outside of the wheels, and suitable cross members. The boiler and cab superstructure are supported on two center pins 14, there being one center pin for each truck 12. Additional support for the cab may be provided by spring loaded pads which may be located to obtain satisfactory distribution of weight on the rails.

As described in my copending application Serial No. 574,553, filed January 25, 1945, each main truck 12 is provided with four driving axles 15, having wheels 16 secured thereto which are of a relatively small diameter. A four-wheel guiding truck 17 is provided at the front end of each main truck 12. Utilization of the small diameter driving wheels permits a comparatively short, rigid wheel base, and also provides additional space for the boiler 11 without increasing the overall weight of the locomotive. In this manner, a boiler of sufficient size to generate steam for operating a locomotive having a high horse power rating may be provided.

The power for propelling the locomotive may be developed by two steam turbines 18, there being one turbine mounted in each main truck 12 with its axis disposed longitudinally of the truck frame. A reverse gear unit 19 may be provided for each turbine to reverse the direction of operation of the locomotive.

Since the main trucks 12 are identical in construction, the structure of only one truck will be described in detail. The torque developed by the turbine 18 is transmitted from the turbine to the driving wheels 16 by means of a drive shaft 21 and gear reduction and flexible drive units 22, which are enclosed in housings 23. The drive shaft 21 is located on the longitudinal center line of the truck and, as shown in Figs. 4 and 5, is provided with suitable bearings 24 and 25 which are located in the gear unit housings 23. It will be noted that the bearing 24 is of the double-tapered type.

As shown, a combined gear reduction and flexible drive unit 22 is provided for each pair of adjacent driving axles, two such units being required for the four driving axles of each main truck 12. A double end flexible spring cup quill drive is provided for each axle 15. The flexible drive may be of the type described in the copending application of W. A. Brecht and F. L. Alben Serial No. 574,554, filed January 25, 1945.

As shown, a spring cup spider 26 is pressed on each end of a quill 27 and engages a mating drive spider 28 which is pressed on the axle 15. Roller bearings 29 are provided in the gear housing 23 for the quill 27. In this manner the driving torque is flexibly transmitted to the driving wheels 16 which may be of a relatively small diameter.

As shown in Figs. 4 and 5, a spur gear 31 is secured to each quill 27 and is driven by a pinion 32 secured to an auxiliary shaft 33 on which is mounted a bevel gear 34 which meshes with a second bevel gear 35 mounted on the main drive shaft 21. These gears are all contained in the gear housing 23, and suitable roller bearings 36 and 37 are provided in the gear housing for each auxiliary shaft 33. The bearing 36 is of the double-tapered type.

As shown, each gear unit housing may be supported by lugs 38 which rest upon brackets 39 secured to cross members of the truck frame 13. The housing 23 is so constructed that a lower portion 41 may be removed to permit the removal of a low speed gear with its quill drive. If desired, an additional portion 42 of each housing may be removed along with the portion 41, thereby permitting the removal of each pair of adjacent driving axles with their component parts without disturbing the remainder of the drive unit. Since the gear unit housing 23 is of an oil tight construction, satisfactory lubrication of all the gears and bearings, which are enclosed within the housing, is provided.

As shown in Fig. 6, a flexible coupling 43 which is preferably of the internal-external gear type, may be provided inside of the housing 23 for the drive shaft 21. A divided collar 44 having a flange 45 may be clamped on the shaft 21 by bolts 46 to limit longitudinal movement of the section of the shaft which extends to the next drive unit 22. A similar coupling and collar may be provided in the next drive unit, thereby limiting longitudinal movement of the shaft 21 in both directions.

From the foregoing description it is apparent that I have provided a locomotive drive which makes it possible to transmit the torque of a fluid turbine to a plurality of driving axles in a simple and efficient manner. The drive possesses sufficient flexibility to permit the misalignments encountered during the operation of the locomotive. Furthermore, the drive is so constructed that all parts may be readily inspected and, if necessary, removed for repair or replacement.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a locomotive drive, in combination, a plurality of pairs of axles, a drive shaft disposed longitudinally of the locomotive, an auxiliary shaft for each axle disposed at right angles to the drive shaft, bevel gear means for interconnecting the drive shaft and said auxiliary shafts, a quill surrounding each axle, means for flexibly connecting the quill to its axle, a gear secured to said quill, a pinion meshing with said gear, said pinion being secured to the auxiliary shaft for said axle, a gear case containing all of said gears for each pair of axles and having bearings therein for said quills and said shafts, said gear cases being split in two horizontal planes, and means for supporting said gear cases independently.

2. In a locomotive drive, in combination, a plurality of pairs of axles, a drive shaft disposed longitudinally of the locomotive, an auxiliary shaft for each axle disposed at right angles to the drive shaft, bevel gear means for interconnecting the drive shaft and said auxiliary shafts, a quill surrounding each axle, means for flexibly connecting the quill to its axle, a gear secured to said quill, a pinion meshing with said gear, said pinion being secured to the auxiliary shaft for said axle, a gear case containing all of said gears for each pair of axles and having bearings therein for said quills and said shafts, said gear cases being split in a horizontal plane through said axle and also in a horizontal plane through said drive shaft, and means secured to the gear cases between said horizontal planes for supporting said gear cases independently.

3. In a locomotive drive, in combination, a plurality of pairs of axles, a drive shaft disposed longitudinally of the locomotive, a gear unit for each pair of axles having an auxiliary shaft for each axle disposed substantially parallel to its axle, bevel gear means for interconnecting the drive shaft and the auxiliary shafts, a quill surrounding each axle, means for flexibly connecting each quill to its axle, spur gears for connecting each auxiliary shaft to its quill, and means for supporting each gear unit independently of the other units.

4. In a locomotive drive, in combination, a plurality of pairs of axles, a drive shaft disposed longitudinally of the locomotive, a gear unit for each pair of axles having an auxiliary shaft for each axle disposed substantially parallel to its axle, bevel gear means for interconnecting the drive shaft and the auxiliary shafts, a quill surrounding each axle, means for flexibly connecting each quill to its axle, spur gears for connecting each auxiliary shaft to its quill, a gear case containing all the gears of said unit, and means for supporting each gear unit independently of the other units.

5. In a locomotive drive, in combination, a pair of axles, a drive shaft disposed longitudinally of the locomotive, a gear unit having an auxiliary shaft for each axle disposed substantially parallel to its axle, bevel gear means for interconnecting the drive shaft and the auxiliary shafts, a quill surrounding each axle, means for flexibly connecting each quill to its axle, spur gears for connecting each auxiliary shaft to its quill, and a gear case containing all the gears of said unit, said gear case being split in a horizontal plane through said axles and also in a horizontal plane through said drive shaft.

FRANK L. ALBEN.

REFERENCES CITED

The following references are of record in the file of this patent:

UNITED STATES PATENTS

| Number | Name | Date |
|---|---|---|
| 2,029,981 | Black | Feb. 14, 1936 |
| 1,572,958 | Reid et al. | Feb. 16, 1926 |
| 2,093,389 | Reidinger | Sept. 14, 1937 |
| 1,132,727 | Levin | Mar. 23, 1915 |
| 1,367,625 | Pender | Feb. 8, 1921 |
| 804,638 | Troeger | Nov. 14, 1905 |

FOREIGN PATENTS

| Number | Country | Date |
|---|---|---|
| 124,469 | Switzerland | Feb. 1, 1928 |
| 76,762 | Switzerland | May 1, 1918 |